US012790282B2

(12) United States Patent
Sakai et al.

(10) Patent No.: US 12,790,282 B2
(45) Date of Patent: Nov. 10, 2026

(54) CERAMIC BODY AND METHOD FOR PRODUCING SAME

(71) Applicant: NGK INSULATORS, LTD., Nagoya-City (JP)

(72) Inventors: Shoji Sakai, Nagoya (JP); Tatsuya Akahani, Komaki (JP); Shuhei Kuno, Komaki (JP)

(73) Assignee: NGK INSULATORS, LTD., Nagoya (JP)

( * ) Notice: Subject to any disclaimer, the term of this patent is extended or adjusted under 35 U.S.C. 154(b) by 174 days.

(21) Appl. No.: 18/432,203

(22) Filed: Feb. 5, 2024

(65) Prior Publication Data

US 2024/0327295 A1 Oct. 3, 2024

(30) Foreign Application Priority Data

Mar. 28, 2023 (JP) ................................ 2023-052276

(51) Int. Cl.
*C04B 35/565* (2006.01)
*C04B 35/626* (2006.01)
(Continued)

(52) U.S. Cl.
CPC ...... *C04B 35/565* (2013.01); *C04B 35/62655* (2013.01); *C04B 35/62828* (2013.01); *C04B 35/638* (2013.01); *C04B 35/64* (2013.01); *C04B 35/657* (2013.01); *C04B 38/0006* (2013.01); *C04B 2235/3826* (2013.01); *C04B 2235/428* (2013.01); *C04B 2235/5436* (2013.01); *C04B 2235/616* (2013.01); *C04B 2235/656* (2013.01); *C04B 2235/6581* (2013.01)

(58) Field of Classification Search
None
See application file for complete search history.

(56) References Cited

U.S. PATENT DOCUMENTS 3,951,587 A * 4/1976 Alliegro .................. C04B 41/85
432/259
4,070,197 A * 1/1978 Coes ..................... C04B 35/573
428/318.6
(Continued)

FOREIGN PATENT DOCUMENTS

JP S51-85374 A 7/1976
JP S63-35452 A 2/1988
(Continued)

OTHER PUBLICATIONS

Japanese Notice of Submission of Publications (Application No. 2023-052276) dated May 13, 2025 (with English translation) (2 pages).
(Continued)

*Primary Examiner* — Seth Dumbris
(74) *Attorney, Agent, or Firm* — Muncy, Geissler, Olds & Lowe, P.C.

(57) ABSTRACT

A method for producing a ceramic body includes: a forming step of forming a forming material containing SiC powders having an average particle size D50 of 15 to 50 μm and SiC powders having an average particle size D50 of 2 to 8 μm in a mass ratio of 3:7 to 7:3 to obtain a formed body; and a firing and impregnating step of firing the formed body and impregnating it with metal Si.

6 Claims, 3 Drawing Sheets

(51) Int. Cl.

| | |
|---|---|
| ***C04B 35/628*** | (2006.01) |
| ***C04B 35/638*** | (2006.01) |
| ***C04B 35/64*** | (2006.01) |
| ***C04B 35/657*** | (2006.01) |
| ***C04B 38/00*** | (2006.01) |

(56) References Cited

U.S. PATENT DOCUMENTS

2005/0255335 A1 11/2005 Suyama et al.
2013/0220309 A1 * 8/2013 Majima .................. F03G 6/066 126/706
2020/0165169 A1 5/2020 Koga

FOREIGN PATENT DOCUMENTS

JP S63-222086 A 9/1988
JP H04238866 A * 8/1992
JP H05319932 A * 12/1993
JP 2000-103677 A 4/2000
JP 2004-018322 A 1/2004
JP 2007-022914 A 2/2007
JP 2011-213540 A 10/2011
JP 2015-042934 A 3/2015
JP 2015-067476 A 4/2015
JP 6763699 B2 9/2020

OTHER PUBLICATIONS

Japanese Notice of Submission of Publications (Application No. 2023-052276) dated May 20, 2025 (with English translation) (2 pages).
Chinese Office Action (Application No. 202410274641.X) dated Mar. 18, 2026 (with English translation) (11 pages).

* cited by examiner

CERAMIC BODY AND METHOD FOR PRODUCING SAME

CROSS REFERENCE TO RELATED APPLICATIONS

The present invention claims the benefit of priority to Japanese Patent Application No 2023-052276 filed on Mar. 28, 2023 with the Japanese Patent Office, the entire contents of which are incorporated herein by reference in its entirety.

FIELD OF THE INVENTION

The present invention relates to a ceramic body and a method for producing the same.

BACKGROUND OF THE INVENTION

Recently, there is a need for improvement of fuel economy of motor vehicles. In particular, a system is expected that worms up a coolant, engine oil and an automatic transmission fluid (ATF: Automatic Transmission Fluid) at an early stage to reduce friction losses, in order to prevent deterioration of fuel economy at the time when an engine is cold, such as when the engine is started. Further, a system is expected that heats an exhaust gas purifying catalyst in order to activate the catalyst at an early stage.

The above system uses a heat exchanger provided with a ceramic body (honeycomb structure) having a honeycomb shape and made of Si-impregnated SiC (Patent Literature 1). The ceramic body is produced by degreasing a ceramic formed body containing silicon carbide (hereinafter referred to as "SiC") and then impregnating it with metal silicon (hereinafter referred to as "Si").

In recent years, an increase in thermal conductivity of the ceramic body made of Si-impregnated SiC has been required for improving performance of a heat exchanger (for example, for improving a heat recovery property).

Since SiC forms the skeletal portions of the ceramic body and has higher thermal conductivity than Si, it is believed that the thermal conductivity of the ceramic body can be improved by increasing a proportion of SiC in the ceramic body.

However, a conventional method has problems that it is difficult to stably increase the proportion of SiC in the ceramic body (skeletal portions), and the thermal conductivity of the ceramic body is not sufficiently improved.

It should be noted that while the ceramic body used for the heat exchanger has been described above as an example, there is also a need for improvement of thermal conductivity of ceramic bodies used for purposes other than the heat exchangers.

The present invention has been made to solve the problems as described above. An object of the present invention is to provide a ceramic body having high thermal conductivity, which is made of Si-impregnated SiC, and a method for producing the same.

PRIOR ART

Patent Literature

[Patent Literature 1] Japanese Patent No. 6763699 B

SUMMARY OF THE INVENTION

As a result of intensive studies for ceramic bodies made of Si-impregnated SiC, the present inventors have found that the above problems can be solved by using a forming material containing two types of SiC powders having predetermined average particle sizes D50 in a predetermined ratio, and they have completed the present invention. That is, the present invention is illustrated as follows:

[1]

A method for producing a ceramic body, comprising:

a forming step of forming a forming material containing SiC powders having an average particle size D50 of 15 to 50 μm and SiC powders having an average particle size D50 of 2 to 8 μm in a mass ratio of 3:7 to 7:3 to obtain a formed body; and a firing and impregnating step of firing the formed body and impregnating it with metal Si.

[2]

The method for producing a ceramic body according to [1], wherein the firing and impregnating step is performed by firing the formed body in contact with the metal Si.

[3]

The method for producing a ceramic body according to [2], wherein the firing is performed in an inert gas atmosphere or in a vacuum at a temperature of 1400 to 1600° C.

[4]

The method for producing a ceramic body according to any one of [1] to [3], wherein ceramic raw materials contained in the forming material are only the SiC powders.

[5]

The method for producing a ceramic body according to any one of [1] to [4], wherein the formed body is subjected to at least one process of a drying process and a degreasing process between the forming step and the firing and impregnating step.

[6]

The method for producing a ceramic body according to any one of [1] to [5], wherein the formed body has a honeycomb shape comprising: an outer peripheral wall; and partition walls disposed on an inner side of the outer peripheral wall, the partition walls defining a plurality of cells each extending from a first end face to a second end face; or a hollow honeycomb shape comprising: an inner peripheral wall; an outer peripheral wall; and partition walls disposed between the inner peripheral wall and the outer peripheral wall, the partition walls defining a plurality of cells each extending from a first end face to a second end face.

[7]

A ceramic body comprising:

SiC skeletal portions each comprising SiC particles having a particle size of 15 to 50 μm and SiC particles having a particle size of 2 to 8 μm in a volume ratio of 3:7 to 7:3; and metal Si-impregnated portions each formed around at least a part of the SiC skeletal portions.

DETAILED DESCRIPTION OF THE INVENTION

Hereinafter, embodiments of the present invention will be specifically described with reference to the drawings. It is to understand that the present invention is not limited to the following embodiments, and those which appropriately added changes, improvements and the like to the following embodiments based on knowledge of a person skilled in the art without departing from the spirit of the present invention fall within the scope of the present invention.

(1) Method for Producing Ceramic Body

A method for producing a ceramic body according to an embodiment of the present invention includes a forming step and a firing and impregnating step. These steps will be described in detail.

<Forming Step>

The forming step is a step of forming a forming material containing SiC powders having an average particle size D50 of 15 to 50 μm (hereinafter abbreviated as "SiC powders A") and SiC powders having an average particle size D50 of 2 to 8 μm (hereinafter abbreviated as "SiC powders B") in a mass ratio of 3:7 to 7:3 to obtain a formed body.

Figure 1:
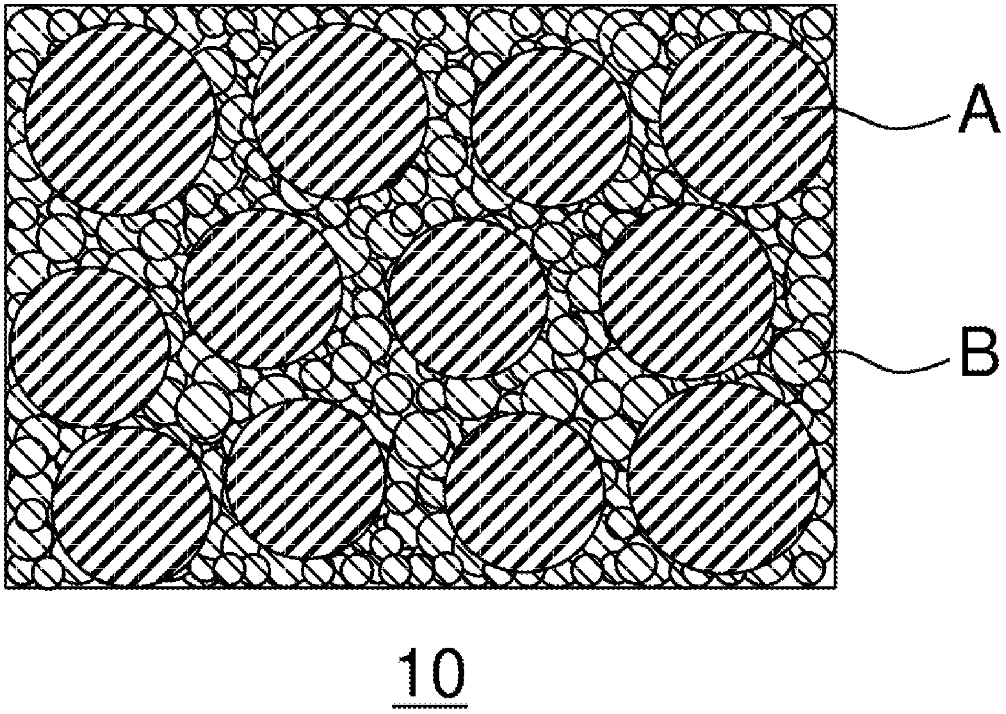
FIG. 1 is a partially enlarged cross-sectional view of a formed body produced according to a method for producing a ceramic body according to an embodiment of the present invention.

Here, FIG. 1 shows a partially enlarged cross-sectional view of a formed body produced under the above conditions. As shown in FIG. 1, by using two types of SiC powders A and B having the average particle sizes D50 in the above mass ratio, the SiC powders B having the smaller average particle size D50 are easily filled between the SIC powders A having the larger average particle size D50 in the formed body 10, so that the bulk density of the SiC powders (SiC powders A and B) making up the formed body 10 can be increased. As a result, the thermal conductivity of the ceramic body obtained by subjecting the formed body 10 to the firing and impregnating step can be improved. On the other hand, conditions other than those described above do not allow the bulk density of the SiC particles making up the formed body to be sufficiently increased, so that the thermal conductivity of the ceramic body cannot be sufficiently improved.

As used herein, the "average particle size D50" of the SiC powders A and B used in the forming step means a particle size at 50% (D50) of the integrated value in the particle size distribution determined by the laser diffraction/scattering method.

Although the SiC powders may be of single type, or in combination of two or more types. Specifically, two or more types of SiC powders A having an average particle size D50 in the range of 15 to 50 μm may be used.

Similarly, the SiC powders B may be of single type, or in combination of two or more types. Specifically, two or more types of SiC powders B having an average particle size D50 in the range of 2 to 8 μm may be used.

The average particle size D50 of the SiC powders A is preferably 20 to 45 μm, and more preferably 25 to 40 μm, from the viewpoint of stably ensuring the above effects.

Further, the average particle size D50 of the SiC powders B is preferably 3 to 7 μm, and more preferably 4 to 6 μm, from the viewpoint of stably ensuring the above effects.

Furthermore, the mass ratio of the SiC powders A and the SiC powders B is preferably 4:6 to 6:4 from the viewpoint of stably ensuring the above effects.

It is preferable that the forming material contains only the SiC powders A and B as ceramic raw materials. Each of the SiC powders A and B has a high thermal conductivity and a thermal expansion coefficient close to those of metal Si impregnated in a step described later, so that a ceramic body having an improved resistance to thermal stress can be obtained.

As used herein, the ceramic raw materials mean the raw materials making up the skeletal portions of the ceramic body after the firing and impregnating step.

The forming material may optionally contain components known in the art. The known components include dispersion media, binders, plasticizers, and dispersants. The contents of these components are not particularly limited as long as they do not inhibit the effects of the present invention.

Examples of the dispersion media include water or a mixed solvent of water and an organic solvent such as alcohol, and more preferably water.

Examples of the binders include organic binders such as methyl cellulose, hydroxypropoxyl cellulose, hydroxyethyl cellulose, carboxymethyl cellulose, and polyvinyl alcohol. In particular, it is preferable to use methyl cellulose in combination with hydroxypropoxyl cellulose. The binders may be used alone, or in combination of two or more.

Examples of the plasticizers include polyoxyalkylene alkyl ethers, polycarboxylic acid-based polymers, and alkyl phosphate esters.

The dispersants that can be used herein includes surfactants such as polyoxyalkylene alkyl ether, ethylene glycol, dextrin, fatty acid soaps, and polyalcohol. The dispersants may be used alone or in combination of two or more.

The forming method is not particularly limited, and known methods such as extrusion molding may be used. In the extrusion molding, a formed body having a desired shape can be obtained by selecting an appropriate die and jig. For example, when obtaining a formed body having a honeycomb shape, an appropriate die and jig can be selected to control the shape and density of cells, the number, length and thickness of the partition walls, the shapes and thicknesses of the outer peripheral wall and the inner peripheral wall.

The shape of the formed body obtained by the forming step incudes, but not particularly limited to, preferably, a honeycomb shape including: an outer peripheral wall and partition walls which are disposed on an inner side of the outer peripheral wall, and which define a plurality of cells each extending from a first end face to a second end face; or a hollow honeycomb shape including: an inner peripheral wall, an outer peripheral wall, and partition walls which are disposed between the inner peripheral wall and the outer peripheral wall and which defines a plurality of cells each extending from a first end face to a second end face. By having such a shape, for example, when it is used in a heat exchanger, the performance (for example, heat recovery performance) can be improved.

Figure 2:
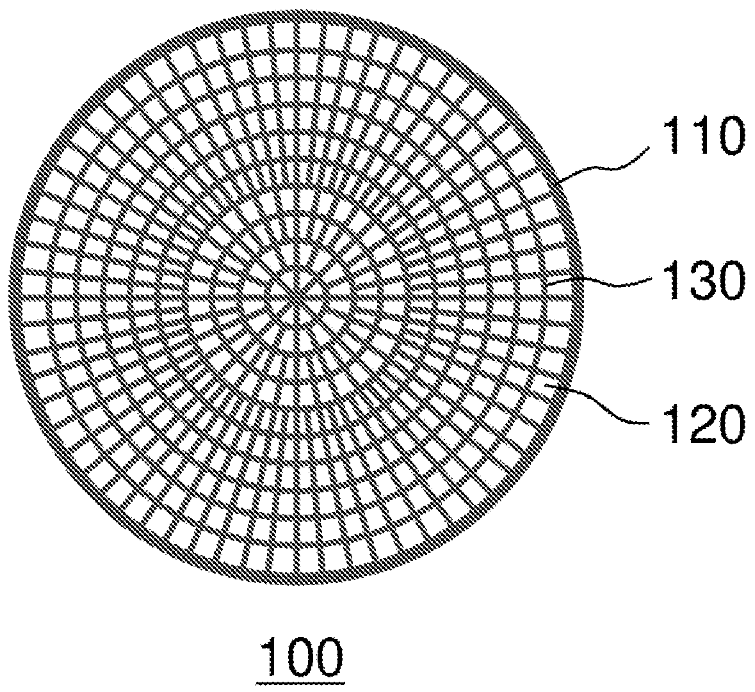
FIG. 2 is a cross-sectional view of a formed body having a honeycomb shape, which is orthogonal to an extending direction of cells.
Figure 3:
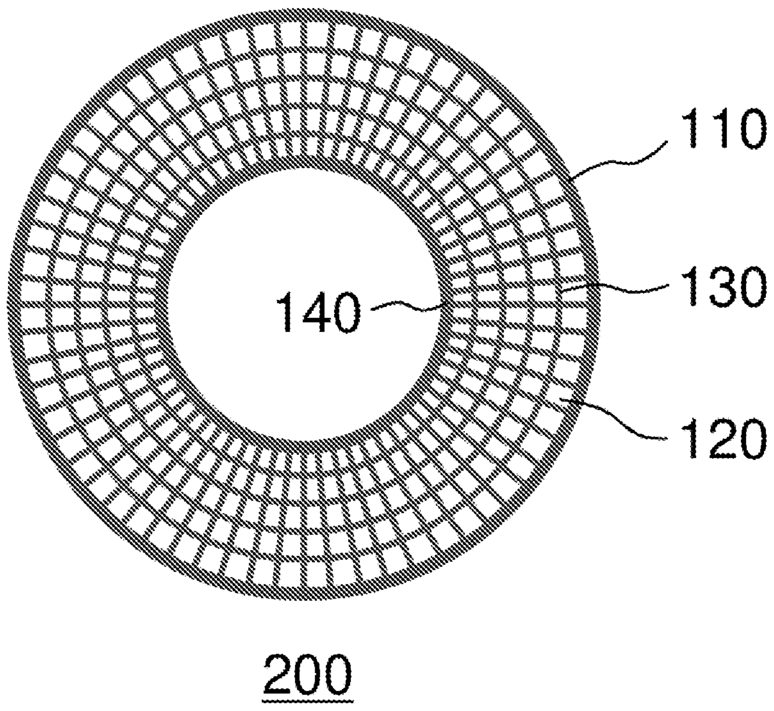
FIG. 3 is a cross-sectional view of a formed body having a hollow honeycomb shape, which is orthogonal to an extending direction of cells.

Here, FIG. 2 shows a cross-sectional view of the formed body having the honeycomb shape (honeycomb formed body), which is orthogonal to the extending direction of the cells, and FIG. 3 shows a cross-sectional view of the formed body having the hollow honeycomb shape (hollow honeycomb formed body), which is orthogonal to the extending direction of the cells.

As shown in FIG. 2, the honeycomb formed body 100 includes: an outer peripheral wall 110; and partition walls 130 which are disposed on an inner side of the outer peripheral wall 110 and which define a plurality of cells 120 each extending from a first end face to a second end face. Further, as shown in FIG. 3, the hollow honeycomb formed body 200 includes: an inner peripheral wall 140; an outer peripheral wall 110; and partition walls 130 which are disposed between the inner peripheral wall 140 and the outer peripheral wall 110, and which defines a plurality of cells 120 each extending from a first end face to a second end face.

Each of the honeycomb formed body 100 and the hollow honeycomb formed body 200 may have any shape (outer shape) including, but not particularly limited thereto, for example, a cylindrical shape, an elliptical pillar shape, a quadrangular pillar shape, or other polygonal pillar shape. That is, each outer shape of the honeycomb formed body 100 and the hollow honeycomb formed body 200 in the cross section orthogonal to the extending direction of the cells 120 can be circular, oval, quadrilateral, or other polygonal. Further, the hollow portion of the hollow honeycomb formed body 200 may have the same or different outer shape(s) as or from the hollow honeycomb formed body 200, and can have the various shapes as described above.

The shape of each cell 120 in the cross section orthogonal to the extending direction of the cells 120 is not limited to the illustrated shapes, and it may be a circle, an oval, a polygon such as a triangle, or the like.

It is preferable that each of the honeycomb formed body 100 and the hollow honeycomb formed body 200 has a structure that satisfies the following features after the firing/impregnating step. It should be noted that each of the honeycomb formed body 100 and the hollow honeycomb formed body 200 after the firing/impregnating step is referred to as a honeycomb structure.

A cell density (that is, the number of cells 120 per unit area) in the cross section of the honeycomb structure orthogonal to the extending direction of the cells 120 may be adjusted as needed depending on applications or the like, and preferably in a range of from 4 to 320 cells/$cm^2$. In the cross section orthogonal to the extending direction of the cells 120, the cell density of 4 cells/$cm^2$ or more can sufficiently ensure the strength of the partition walls 130, hence the strength of the honeycomb structure itself and effective GSA (geometrical surface area). Further, the cell density of 320 cells/$cm^2$ or less can allow prevention of an increase in a pressure loss when the fluid flows.

The thickness of the partition walls 130 of the honeycomb structure may be designed as needed depending on the purpose, but it may preferably be 50 μm to 2 mm, and more preferably 60 μm to 600 μm. When the thickness of the partition walls 130 is 50 μm or more, mechanical strength is improved so that any damage caused by impact or thermal stress can be suppressed. On the other hand, when the thickness of the partition walls 130 is 2 mm or less, the ratio of the cell volume to the honeycomb structure increases, thereby reducing the pressure loss of the fluid so that a heat exchange rate can be improved.

The thickness of each of the outer peripheral wall 110 and inner peripheral wall 140, where present, of the honeycomb structure may be appropriately designed depending on the purpose, but when it is used for the heat exchange application, the thickness is preferably more than 0.3 mm and less than or equal to 10 mm, and more preferably 0.5 mm to 5 mm, and even more preferably 1 mm to 3 mm. Further, when it used for the heat storage application, the thickness of the outer peripheral wall 110 may be 10 mm or more to increase the heat capacity of the outer peripheral wall 110.

<Firing and Impregnating Step>

The firing and impregnating step is a step of firing the formed body and impregnating it with metal Si.

The conditions for the firing and impregnating step are not particularly limited, and this step can be performed according to known methods. Further, in the firing and impregnating step, the firing and the impregnating can be performed in one step, but the firing and the impregnating may be performed in separate steps. Specifically, the firing step and the impregnating step may be performed as separate steps.

The firing and impregnating step is preferably performed by firing the formed body in contact with metal Si. By performing the firing in such a state, the molten metal Si can enter gaps between the ceramic particles making up the formed body by capillary action, thereby impregnating the formed body with metal Si. Also, according to such a method, the firing and the impregnating can be performed in one step, so that production costs can be reduced.

Although the position in the formed body with which the metal Si is contacted is not particularly limited, the contacting is preferably performed while placing the metal Si on the upper surface of the formed body. For example, when using the honeycomb formed body 100 and the hollow honeycomb formed body 200 as the formed bodies, the positions with which metal Si is contacted may be any of the end face (first end face or second end face), the outer peripheral wall 110, and the inner peripheral wall 140 where present. Also, if the extending direction of the cells 120 is the vertical direction, it is preferable that the metal Si is placed on the end face (first end faces or second end faces) located above the honeycomb formed body 100 and the hollow honeycomb formed body 200 and brought into contact with them. The contacting in such a manner leads to easy impregnation with metal Si due to gravity.

The firing is preferably carried out in an inert gas atmosphere or in a vacuum at a temperature of 1400 to 1600° C. The firing under such conditions leads to easy impregnation with metal Si. Also, it can suppress any insufficient sintering due to oxidation, and reduce oxides contained in the forming material.

Examples of the inert gas atmosphere include a nitrogen gas atmosphere, a rare gas atmosphere such as argon, or a mixed gas atmosphere thereof.

The firing temperature is preferably 1450 to 1550° C. from the viewpoint of stably ensuring the above effects. It should be noted that the firing time is not particularly limited, but it is typically 0.25 to 5 hours.

It should be noted that a firing furnace used for firing is not particularly limited, but an electric furnace, a gas furnace, and the like may be used.

Other Step

Between the forming step and the firing and impregnating step, the formed body may be subjected to at least one process of a drying process and a degreasing process. Further, after the firing and impregnating step, surface processing such as polishing may be performed.

The drying process is not particularly limited, and any known method can be used. For example, the drying process may be performed using a microwave dryer, a hot air dryer, a dielectric dryer, a reduced pressure dryer, a vacuum dryer, a freeze dryer, or the like.

The degreasing process is for burning and removing components such as binders. The conditions for the degreasing process are not particularly limited as long as the binder and the like can be burned out, and they may be appropriately set depending on the type of the binder and the like. For example, the degreasing process can be performed by heating the formed body at 300 to 600° C. for 1 to 10 hours.

(2) Ceramic Body

A ceramic body according to an embodiment of the present invention is obtained by the method for producing the ceramic body as described above. The ceramic body includes SiC skeletal portions and metal Si-impregnated portions.

The SiC skeletal portions contain SiC particles having a particle size of 15 to 50 μm and SiC particles having a particle size of 2 to 8 μm in a volume ratio of 3:7 to 7:3. The SiC skeletal portions containing two types of SiC particles having the defined particle sizes in the above volume ratio allows the proportion of the SiC particles in the ceramic body to be increased, thereby improving the thermal conductivity of the ceramic body.

Here, the volume ratio of the SiC particles having the particle size of 15 to 50 μm and the SiC particles having the particle size of 2 to 8 μm in the ceramic body can be determined by observing the cross section of the ceramic body using an SEM. Specifically, in a SEM image of the cross section of the ceramic body, the SiC particles having the particle size of 15 to 50 μm and the SiC particles having the particle size of 2 to 8 μm are distinguished. At this time, the particle size of the SiC particles is an equivalent circle diameter. Then, a ratio of the total area of the SiC particles having the particle size of 15 to 50 μm and the total area of the SiC particles having the particle size of 2 to 8 μm in the ceramic body is defined as the volume ratio of the SiC particles having the particle size of 15 to 50 μm and the SiC particles having the particle size of 2 to 8 μm in the ceramic body The metal Si-impregnated portions are formed at gaps of at least part of the SiC skeletal portions. By forming the metal Si-impregnated portions, the ceramic body can be made dense to increase the thermal conductivity and strength.

The thermal conductivity of the ceramic body is preferably 140 W/mK or more, and more preferably 150 W/mK or more, at 25° C., although not particularly limited thereto. When the ceramic body is used in the heat exchanger, the thermal conductivity of the ceramic body in the above range allows the heat recovery performance of the heat exchanger to be improved. In addition, the value of the thermal conductivity means a value measured by the laser flash method (JIS R1611: 1997).

Other features regarding the materials making up the ceramic body, its shape, and the like, are the same as described in the method for producing the ceramic body, and descriptions thereof will be omitted herein.

EXAMPLES

Hereinafter, the present invention will be described in more detail with reference to Examples, but the present invention is not limited to these Examples.

Examples 1 to 4

Three types of SiC powders having average particle diameters D50 of 35 μm, 25 μm, and 5 μm were prepared.

Two or three types of these SiC powders were then mixed in each mass ratio as shown in Table 1, and 28 parts by mass of water and 7 parts by mass of methylcellulose were further added to 100 parts by mass of the total amount of SiC powders and mixed to obtain a forming material. The forming material was extruded to obtain a formed body having a honeycomb structure. The size of each honeycomb formed body was adjusted so that it became a honeycomb structure having the following shape after the firing and impregnating step:

- Shape of the honeycomb structure in the cross section orthogonal to the extending direction of the cells: circular;
- Cell shape in the cross section orthogonal to the extending direction of the cells: quadrangular:
- Length in the extending direction of the cells: 100 mm;
- Outer diameter of the honeycomb structure in the cross section orthogonal to the extending direction of the cells: 100 mm;
- Cell density: 14 cells/cm$^2$;
- Thickness of the partition wall: 0.3 mm; an
- Thickness of the outer peripheral wall: 1.5 mm.

The honeycomb formed body was then arranged so that the extending direction of the cells was the vertical direction, the metal Si was placed on the upper end face, and then fired in a vacuum at a temperature of 1500° C. to obtain a honeycomb structure (ceramic body).

Comparative Examples 1 and 2

A honeycomb structure (ceramic body) was obtained by the same method as that of the above Example, with the exception that SiC powder having an average particle size D50 of 35 μm or SiC powder having an average particle size D50 of 5 μm was used alone.

The thermal conductivity of each honeycomb structure obtained above was measured at 25° C. using the laser flash method (JIS R1611: 1997). In the evaluation of the thermal conductivity, the honeycomb structure having a thermal conductivity of 150 W/mK or more is represented by double circle (excellent: A), the honeycomb structure having a thermal conductivity of 140 W/mK or more and less than 150 W/mK is represented by circle (good: B), and the honeycomb structure having a thermal conductivity less than 140 W/mK is represented as C (poor). The results are shown in Table 1.

TABLE 1

| | SiC Powder (D50) | | | |
|---|---|---|---|---|
| | 35 μm | 25 μm | 5 μm | Thermal Conductivity |
| Ex. 1 | 50 | 0 | 50 | A |
| Ex. 2 | 25 | 25 | 50 | A |
| Ex. 3 | 70 | 0 | 30 | B |
| Ex. 4 | 30 | 0 | 70 | B |
| Comp. 1 | 100 | 0 | 0 | C |
| Comp. 2 | 0 | 0 | 100 | C |

As shown in Table 1, each of the honeycomb structures (ceramic bodies) according to Examples 1 to 4 which were produced using the SiC powders having the average particle size D50 of 15 to 50 μm and the SiC powders having an average particle size D50 of 2 to 8 μm in the mass ratio of 3:7 to 7:3 had the higher thermal conductivity than each of the honeycomb structures (ceramic bodies) according to Comparative Examples 1 and 2 which were produced using the single type of SiC powder.

As can be seen from the above results, according to the present invention, it is possible to provide a ceramic body having high thermal conductivity, which is made of Si-impregnated SiC, and a method for producing the same.

DESCRIPTION OF REFERENCE NUMERALS

10 formed body
100 honeycomb formed body
110 outer peripheral wall

120 cell
130 partition wall
140 inner peripheral wall
200 hollow honeycomb formed body

The invention claimed is:

1. A method for producing a ceramic body, comprising:

a forming step of forming a forming material containing SiC powders having an average particle size D50 of 25 to 45 μm and SiC powders having an average particle size D50 of 4 to 8 μm in a mass ratio of 3:7 to 7:3 to obtain a formed body; and a firing and impregnating step of firing the formed body and impregnating it with metal Si;

wherein the formed body has a honeycomb shape comprising: an outer peripheral wall; and partition walls disposed on an inner side of the outer peripheral wall, the partition walls defining a plurality of cells each extending from a first end face to a second end face; or a hollow honeycomb shape comprising: an inner peripheral wall; an outer peripheral wall; and partition walls disposed between the inner peripheral wall and the outer peripheral wall, the partition walls defining a plurality of cells each extending from a first end face to a second end face.

2. The method for producing a ceramic body according to claim 1, wherein the firing and impregnating step is performed by firing the formed body in contact with the metal Si.

3. The method for producing a ceramic body according to claim 2, wherein the firing is performed in an inert gas atmosphere or in a vacuum at a temperature of 1400 to 1600° C.

4. The method for producing a ceramic body according to claim 1, wherein ceramic raw materials contained in the forming material are only the SiC powders.

5. The method for producing a ceramic body according to claim 1, wherein the formed body is subjected to at least one process of a drying process and a degreasing process between the forming step and the firing and impregnating step.

6. A ceramic body comprising:

SiC skeletal portions each comprising SiC particles having a particle size of 15 to 50 μm and SiC particles having a particle size of 2 to 8 μm in a volume ratio of 3:7 to 7:3; and metal Si-impregnated portions each formed at gaps of at least part of the SiC skeletal portions;

wherein the ceramic body has a thermal conductivity of 140 W/mK or more at 25° C.; and wherein the ceramic body has a honeycomb shape comprising: an outer peripheral wall; and partition walls disposed on an inner side of the outer peripheral wall, the partition walls defining a plurality of cells each extending from a first end face to a second end face; or a hollow honeycomb shape comprising: an inner peripheral wall: an outer peripheral wall; and partition walls disposed between the inner peripheral wall and the outer peripheral wall, the partition walls defining a plurality of cells each extending from a first end face to a second end face.

* * * * *